(12) United States Patent
Quiet et al.

(10) Patent No.: US 10,489,337 B2
(45) Date of Patent: Nov. 26, 2019

(54) METHOD, APPARATUS AND SYSTEM FOR DYNAMIC OPTIMIZATION OF SIGNAL INTEGRITY ON A BUS

(71) Applicant: Intel Corporation, Santa Clara, CA (US)

(72) Inventors: Duane G. Quiet, Hillsboro, OR (US); Amit Kumar Srivastava, Folsom, CA (US); Kenneth P. Foust, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 15/198,027

(22) Filed: Jun. 30, 2016

(65) Prior Publication Data
US 2018/0004699 A1    Jan. 4, 2018

(51) Int. Cl.
*G06F 13/00* (2006.01)
*G06F 13/42* (2006.01)
*G06F 1/3296* (2019.01)
*G06F 13/16* (2006.01)
*G06F 13/40* (2006.01)

(52) U.S. Cl.
CPC ........ *G06F 13/4282* (2013.01); *G06F 1/3296* (2013.01); *G06F 13/1673* (2013.01); *G06F 13/4022* (2013.01)

(58) Field of Classification Search
CPC ...................................................... G06F 13/00
USPC ........................................................ 710/106
See application file for complete search history.

(56) References Cited

U.S. PATENT DOCUMENTS

| 6,100,676 | A  | * | 8/2000 | Burstein | ............ | H02M 3/1584 |
|---|---|---|---|---|---|---|
|   |    |   |        |          |              | 323/283 |
| 6,502,212 | B1 |   | 12/2002 | Coyle et al. | | |
| 8,996,892 | B1 |   | 3/2015 | Chu et al. | | |
| 2004/0204879 | A1 |   | 10/2004 | Slaight et al. | | |
| 2005/0057292 | A1 | * | 3/2005 | Sidiropoulos | ............ | G06F 1/10 |
|   |    |   |        |          |              | 327/233 |
| 2005/0228935 | A1 | * | 10/2005 | Klein | .................. | G06F 13/1684 |
|   |    |   |        |          |              | 710/316 |
| 2005/0254332 | A1 | * | 11/2005 | Klein | ................. | G06F 13/4077 |
|   |    |   |        |          |              | 365/230.06 |

(Continued)

OTHER PUBLICATIONS

International Searching Authority, "Notification of Transmittal of the International Search Report and the Written Opinion of the International Searching Authority," dated Aug. 28, 2017, in International application No. PCT/US2017/034184.

(Continued)

*Primary Examiner* — Titus Wong
(74) *Attorney, Agent, or Firm* — Trop, Pruner & Hu, P.C.

(57) ABSTRACT

In one embodiment, a host controller is to couple to an interconnect to which a plurality of devices may be coupled. The host controller may include: a first driver to drive first information onto the interconnect; and a first receiver to receive second information comprising parameter information of at least one of the plurality of devices from the interconnect. The host controller may further include an integrity control circuit to receive the parameter information of the at least one of the plurality of devices and dynamically update at least one capability of the host controller based at least in part on the parameter information. Other embodiments are described and claimed.

18 Claims, 6 Drawing Sheets

(56) References Cited

U.S. PATENT DOCUMENTS

| | | | |
|---|---|---|---|
| 2007/0143638 A1* | 6/2007 | Dobyns | G01R 1/06788 |
| | | | 713/300 |
| 2008/0256148 A1 | 10/2008 | Kitamura et al. | |
| 2009/0045854 A1* | 2/2009 | Sidiropoulos | G06F 1/10 |
| | | | 327/144 |
| 2009/0300260 A1* | 12/2009 | Woo | G06F 13/4243 |
| | | | 710/316 |
| 2009/0323241 A1* | 12/2009 | Harb | H02H 3/20 |
| | | | 361/91.2 |
| 2010/0153680 A1* | 6/2010 | Baum | G06F 11/008 |
| | | | 711/173 |
| 2010/0169523 A1 | 7/2010 | Dunstan et al. | |
| 2012/0050015 A1* | 3/2012 | Low | G06K 7/10158 |
| | | | 340/10.1 |
| 2014/0129687 A1 | 5/2014 | Halpern | |
| 2014/0149805 A1* | 5/2014 | Michihata | G06F 11/0751 |
| | | | 714/48 |
| 2015/0006771 A1* | 1/2015 | Horowitz | G06F 13/4072 |
| | | | 710/104 |
| 2015/0213852 A1* | 7/2015 | Horowitz | G06F 13/4072 |
| | | | 710/110 |
| 2017/0010999 A1* | 1/2017 | Berge | G06F 13/4282 |
| 2017/0097912 A1* | 4/2017 | Takahashi | G06F 13/4291 |

OTHER PUBLICATIONS

R. Colin Johnson, "MEMS/Sensor Interface I3C Rocks, MIPI Alliance offer improved sensor spec at MEC," Times, Nov. 12, 2014, 3 pages.

* cited by examiner

METHOD, APPARATUS AND SYSTEM FOR DYNAMIC OPTIMIZATION OF SIGNAL INTEGRITY ON A BUS

TECHNICAL FIELD

Embodiments relate to optimization of bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

One recent interface technology is an I3C bus according to an I3C Specification, expected to become available from the Mobile Industry Processor Interface (MIPI) Alliance™ (www.mipi.org). This interface is expected to be used to serially connect devices, such as internal or external sensors or so forth, to a host processor, applications processor or standalone device via a host controller or input/output controller. Typically, characteristics of the controller and the bus itself are designed for a worst case scenario, which assumes that each device coupled to the bus exhibits maximum characteristics for various parameters including parasitic capacitance loading, leakage current and so forth. As a result, many systems are over-designed by a system designer, unnecessarily consuming greater power consumption, extra circuitry, real estate, and potentially reduced performance.

DETAILED DESCRIPTION

In various embodiments, techniques are provided to optimize bus speed, bus data throughput, and/or power for a bus structure such as a multi-drop bus. Although the scope of the present invention is not limited in this regard, example buses may include a multi-drop bus such as a bus in accordance with the forthcoming I3C specification.

To enable optimization techniques herein, a master such as a host controller, bus master, and/or main master, may be provided with knowledge of certain device information, e.g., including parasitic information (such as leakage and load capacitance) of each device coupled to the bus. Additionally, embodiments provide techniques to re-optimize characteristics such as speed, output swing, rise/fall times, duty cycle, and/or device power as topology changes due to dynamically added/removed devices. Embodiments are applicable to internal buses and external buses such as an external connector.

To obtain device information, in an embodiment a host controller (e.g., bus master) on a multi-drop bus may be configured to read device information, e.g., from registers included within slaves devices coupled the bus. In an embodiment, such devices may include one or more configuration registers or other registers to store information about parasitic loading such as leakage current and pin capacitance. The host controller may receive such information from all connected devices and based at least in part thereon, determine one or more parameters of the host controller itself and/or bus to optimize its capabilities. Such capabilities may include, but are not limited to, power, bus rate, slew-rate, delay, etc.

Figure 1:
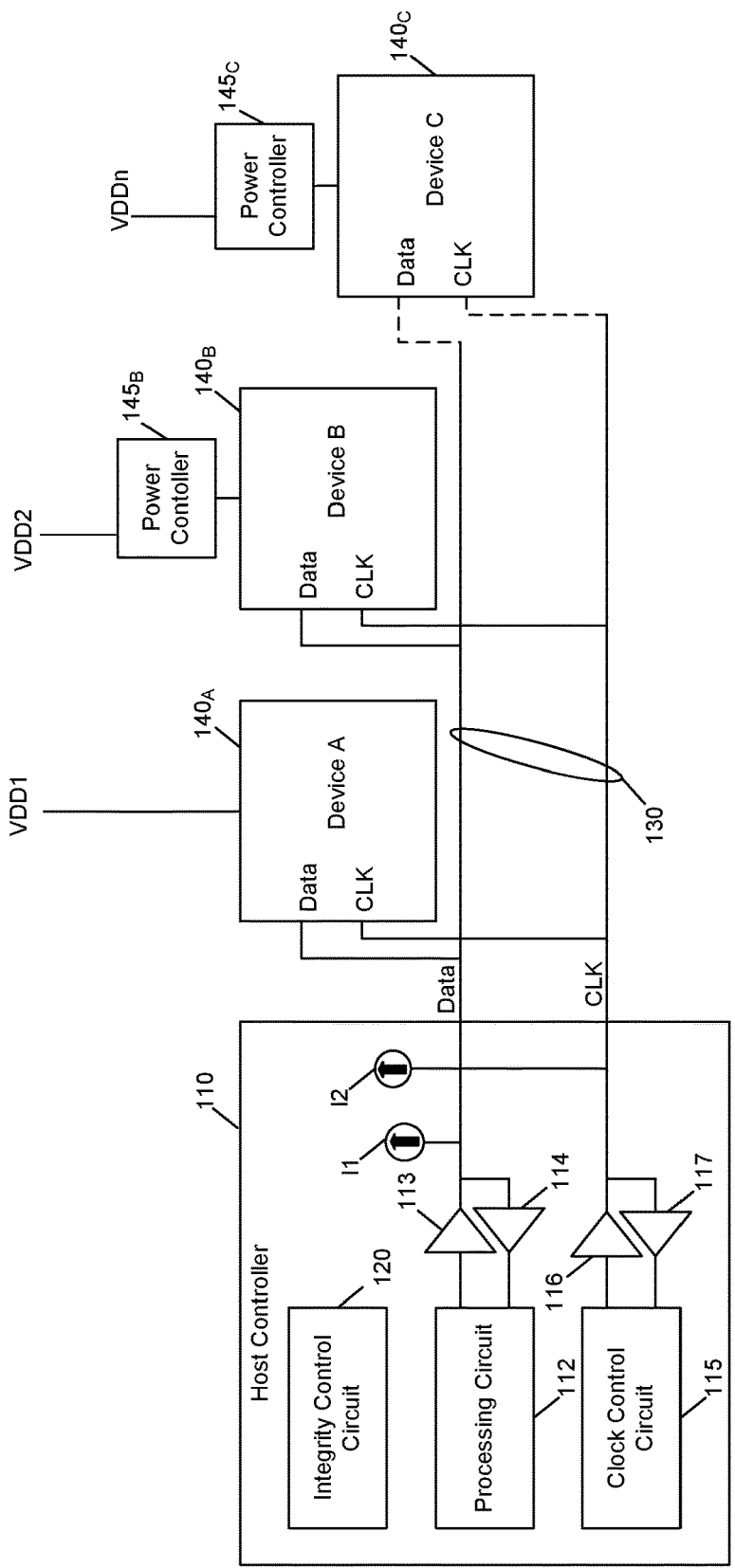
FIG. 1 is a block diagram of a system in accordance with an embodiment of the present invention.

Referring now to FIG. 1, shown is a block diagram of a system in accordance with an embodiment of the present invention. As shown in FIG. 1, a portion of a system 100 includes a host controller 110 coupled to a plurality of devices $140_A$-$140_C$ via a multi-drop bus 130. Devices 140 (also referred to herein as "slaves") may have different parasitic and other characteristics and also may have different capabilities of being added/removed from bus 130. Different combinations of connected/active devices 140 may change the bus total capacitance and leakage.

Host controller 110 may be configured to control data and clock signal integrity, as well as use (e.g.) internal current sources to hold the bus when all devices are off. In some cases, host controller 110 may be a relatively simple host controller for a low complexity bus or other multi-drop bus, such as in accordance with an I²C or I3C Specification. Other multi-drop interfaces such as Serial Peripheral Interface and/or Microwire also may be present in particular embodiments.

As will be described herein, host controller 110 may be configured as a bus master, in at least certain operational phases. As bus master, host controller 110 may receive parameter information from one or more of devices 140 during dynamic operation, e.g., as a bus is reset, and/or as one or more devices are added onto the bus dynamically. Based at least in part on such parameter information, host controller 110 may optimize various aspects of its own configuration, e.g., to improve signal integrity on bus 130, reduce power consumption within host controller 110 or otherwise optimize operation, as will be described in detail herein. Understand that while described with a limited number of characteristics/parameters, techniques can be scaled beyond signal integrity and bus behavior to other device/system parameters and bus behavior, such as output swing, rise/fall time, duty cycle, bus speed and device power.

Before discussing such optimization activities, note that bus 130 is implemented as a two-wire bus in which a single serial line forms a data interconnect and another single serial line forms a clock interconnect. As such, data and clock communications can occur, e.g., in bidirectional manner.

At the high level illustrated in FIG. 1, assume that different types of devices 140 are present. Specifically, device $140_A$ may be always powered on and present as being coupled to bus 130. As an example, device $140_A$ may be a given type of sensor, such as an accelerometer or other sensor which may be incorporated in a given system (such as a smartphone or other mobile platform). As illustrated, device $140_A$ may be powered by connection to a supply voltage (Vdd1). For purposes of discussion herein, assume that device $140_A$ operates as a slave to host controller 110.

Referring now to second device $140_B$, such device may be power controlled via a power controller $145_B$. In different cases, power controller $145_E$ may be incorporated within device $140_E$ or may be managed as a separate power controller (such as a platform power controller (e.g., a power management integrated circuit (PMIC)), which may control device $140_B$ to be powered (via connection to Vdd2) when device $140_B$ is to be active. As an example, assume that device $140_E$ is another type of sensor, such as a camera device. In such example, device $140_E$ may be powered on only when a camera functionality of the system is active.

In turn, device $140_C$ may be power controlled via a power controller $145_C$, which may be incorporated within device $140_C$ or a separate power controller, to control device $140_C$ to be powered (via connection to Vdd3), e.g., when device $140_C$ is coupled to bus 130. That is, device $140_C$ may be a slave device that can be physically added/removed via a hot plug or hot unplug operation. As examples device $140_C$ may be a cable, card, or external peripheral device.

As one example configuration parameter, host controller 110 may dynamically control/configure one or more current source devices to hold bus 130 at a logic high level against a total leakage current of all devices coupled to bus 130. By dynamically controlling such current source(s) (which may be external or integrated within host controller 110) power consumption can be optimized based at least in part on the actual total leakage current of the sum of the devices. Additional configuration parameters for host controller 110 may further include dynamic control of pull-up and/or pull-down resistors. In addition, input parameters of receive functionality within host controller 110, such as hysteresis, voltage input levels, clamping voltage levels, and so forth, also may be dynamically controlled based on the device information. Such input parameters of host controller 110 may be updated based on slave device configuration and/or register settings. Still further, host controller 110 may dynamically optimize the current source(s) to compensate for addition/removal of devices. It could also disallow a potential hot-plug device from attaching to bus 130 (e.g., by not initializing it with an address) if the device leakage from the to-be attached device is too large for the existing system.

As another example configuration parameter, host controller 110 may dynamically control/configure an output buffer impedance and/or slew rate based at least in part on total system capacitance loading. To this end, host controller 110 may be configured to optimize one or more buffer parameters, output swing and impedance, output rise/fall time, data duty cycle, bus speed and device power for an initial power setting, and further to dynamically update such parameters after addition/removal of devices in the bus topology.

As a still further example configuration parameter, host controller 110 may dynamically control/configure one or more delay paths, such as by way of addition/removal of delay elements in read/write paths for optimization based at least in part on different parasitic loading presented by devices coupled to bus 130. Host controller 110 may be configured to optimize the delays for an initial power setting, and further to dynamically update such parameters after addition/removal of devices in the bus topology.

As illustrated in FIG. 1, host controller 110 includes a processing circuit 112. Understand that many different types of host controllers can be provided. As examples, host controller 110 may be an interface circuit of a multicore processor or other system on chip (SoC), application processor or so forth. In other cases, host controller 110 may be a standalone host controller for bus 130. And of course other implementations are possible. In different implementations, processing circuit 112 may represent one or more cores or other hardware processing logic of a particular device or it may simply be part of an interface circuit to act as transmitter and receiver for host controller 110. In turn, processing circuit 112 couples to a driver 113 that drives data onto bus 130 and a receiver 114 that receives incoming data via a data line of bus 130.

To this end, to enable data to be driven and received, a first current source $I_1$ couples to bus 130 at a trace of host controller 110. Current source $I_1$ may couple to a given supply voltage as an open drain connection. In an embodiment, current source $I_1$ may implemented as a controllable resistance (such as a parallel set of resistors) controllably selectable, e.g., via switches such as metal oxide semiconductor field effect transistors (MOSFETs). By way of control as described herein a given programmable resistance may thus couple between a voltage rail and, e.g., driver 113. In one embodiment driver 113 may be implemented to include a MOSFET having a gate driven by internal logic within host controller 110 to control the output voltage, a drain coupled to bus 130 and a source coupled to ground (details of this connection are not shown for ease of illustration in FIG. 1).

To provide a clock signal (and/or to receive a clock signal, in implementations for certain buses), a clock control circuit 115 couples to a clock line of bus 130 via corresponding driver 116 and receiver 117. In turn, another current source $I_2$ may be similarly configured to enable programmable control of parameters on the clock line of bus 130.

Host controller 110 further includes an integrity control circuit 120. In various embodiments, integrity control circuit 120 may be configured to perform the dynamic optimization of host controller configuration. Still further, as described herein integrity control circuit 120 may be configured as a bus topology arbiter to determine whether a newly added device on bus 130 is allowed to be maintained on bus, to ensure correct operation as to a current or available configuration. Integrity control circuit 120 may receive parameter information from devices on bus 130 and, based at least in part on this information, determine control parameters for host controller 110. In an embodiment, based on analysis of the received parameter information, integrity control circuit 120 may access one or more lookup tables to identify appropriate settings. In other cases, integrity control circuit 120 may execute one or more algorithms to dynamically calculate optimized settings. Understand while shown at this high level in the embodiment of FIG. 1, many variations and alternatives are possible.

Figure 2:
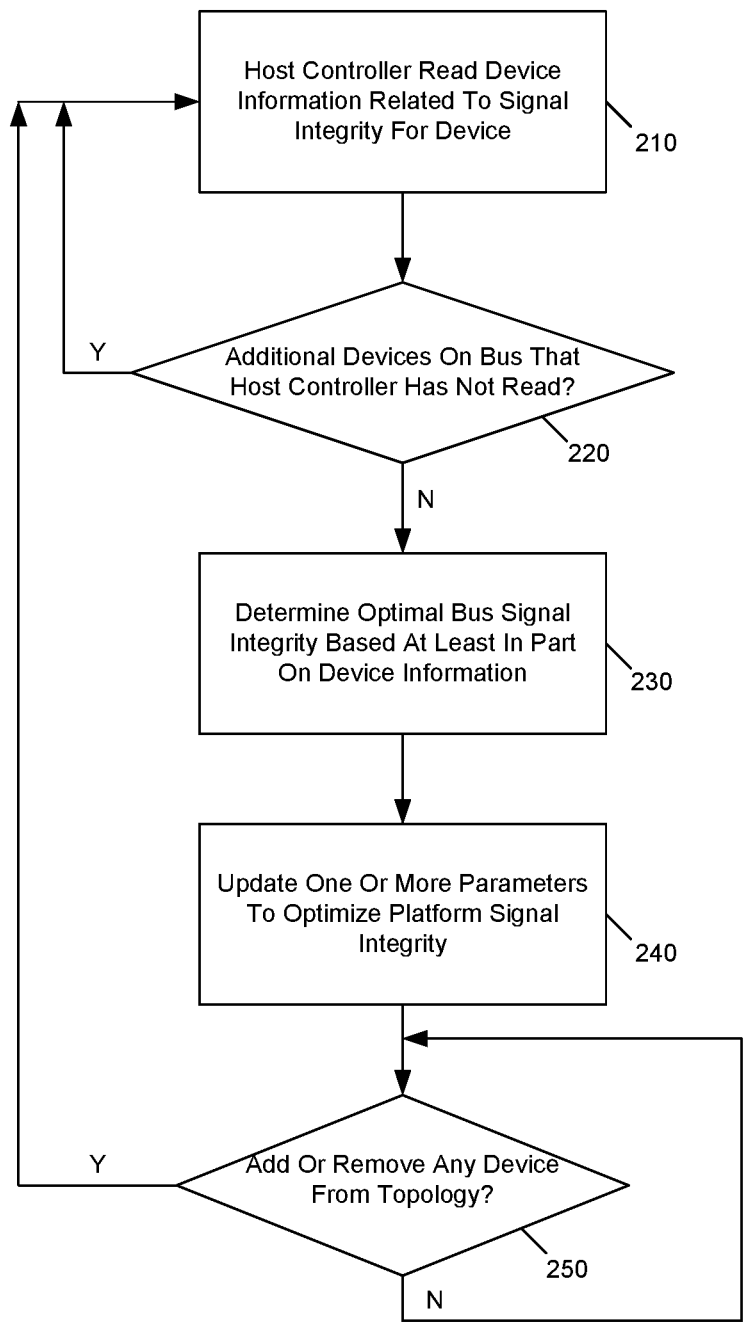
FIG. 2 is a flow diagram of a method in accordance with an embodiment of the present invention.

Referring now to FIG. 2, shown is a flow diagram of a method in accordance with an embodiment of the present invention. More specifically method 200 shown in FIG. 2 is a method for performing dynamic signal integrity control of a multi-drop bus in accordance with an embodiment. In various embodiments, method 200 may be performed by hardware, software and/or firmware (or combinations thereof) such as an integrity control circuit of a host controller. As illustrated, method 200 begins by reading (or otherwise obtaining), by the host controller, device information (e.g., one or more parameters) from a new device on the bus (block 210). Although the scope of the present invention is not limited in this regard such device information may relate to, e.g., pin leakage information, pin capacitance information, drive capabilities or so forth. As an example, a host controller as bus master may issue a request to a newly joined device to obtain such information. More specifically, each such device may include one or more configuration storages such as registers to store this information as fused into the device (such as a given sensor, camera or other IP block) by a manufacturer.

Still with reference to FIG. 2, it can be determined at diamond 220 whether additional devices are on the bus that the host controller has not read. If so, control passes back to block 210. Otherwise, at block 230 the host controller may determine optimal bus signal integrity. Different manners of dynamically calculating one or more configuration values to realize optimal bus signal integrity can occur in different embodiments. For example, with regard to pin capacitance, assume that based on such information from all identified devices a total pin capacitance on the bus is at a first level (e.g., five picofarads (pF)). As such, this value may be used to access configuration parameters stored in a lookup table. Such configuration parameters may include, e.g., current source settings to enable an appropriate current source to be provided. In other embodiments, instead of a lookup table operation, dynamic calculations may be performed to determine appropriate settings by way of using obtained parameter information in one or more equations or other heuristic models.

Next with reference to FIG. 2, one or more configuration parameters within the host controller may be updated to optimize platform signal integrity (block 240). As examples, one or more current sources can be configured for open-drain pull up resistance control, and/or output buffer impedance/slew rate can be adjusted. Still further in some cases delays on write/read paths can be updated among others.

Thus at this point an optimization of signal integrity on a multi-drop bus has been realized, along with potential optimization of host controller operation, including reductions in power consumption. Note that during system operation, dynamic changes may occur on the bus, including the addition and/or removal of one or more devices. As such, during operation it can be determined at diamond 250 whether any such changes have occurred on the bus, namely whether one or more devices have been added or removed with regard to the bus topology. If so, control passes back to block 210 discussed above. Otherwise no further action occurs. Understand while shown at this high level in the embodiment of FIG. 2, many variations and alternatives are possible.

Figure 3:
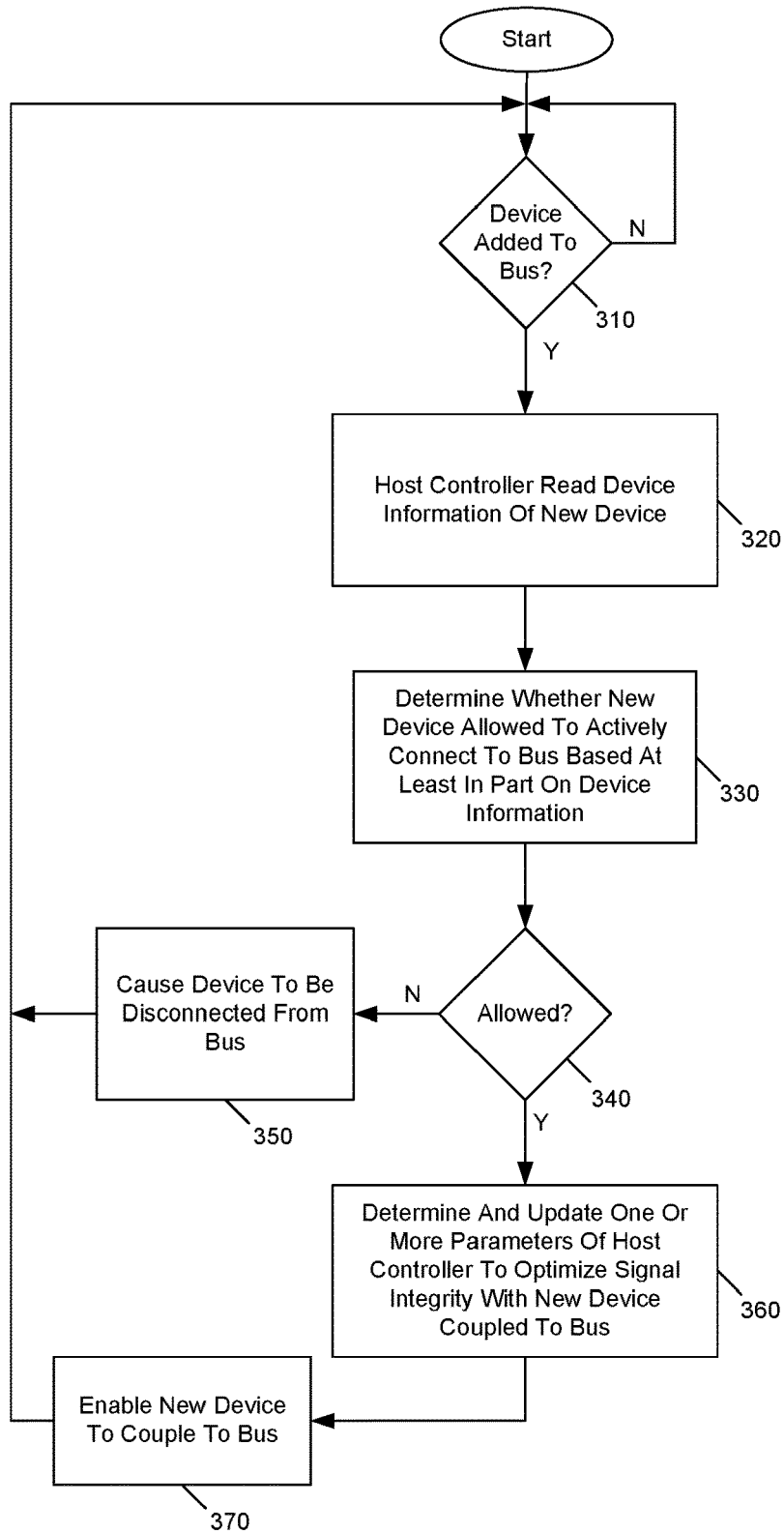
FIG. 3 is a flow diagram of a method in accordance with another embodiment of the present invention.

As an example, an integrity control circuit as described herein may further, in bus mastering mode, determine when a device is dynamically added to the bus whether such device is allowed to be actively connected to the bus, e.g., based on various metrics. Referring now to FIG. 3, shown is a flow diagram of a method in accordance with another embodiment of the present invention. In various embodiments, method 300 may be performed by hardware, software and/or firmware (or combinations thereof) such as an integrity control circuit of a host controller. As illustrated, it may be determined at diamond 310 whether a new device is added to the bus. Note that this determination may thus correspond to diamond 250 of FIG. 2. If a new device is added, device information may be obtained (block 320), as described above. Thereafter at block 330 the integrity control circuit (and more specifically a bus topology arbiter circuit) may determine whether the new device is allowed to actively connect to the bus. Note that this determination may be based at least in part on the device information provided by the new device, in consideration of the one or more devices already present on the bus. For example, with the additional pin capacitance, pin leakage, drive capabilities or other parameters of the new device, signal integrity may be harmed.

If a determination is made that the new device is not to be allowed (as determined at diamond 340), control passes to block 350 where the device may be caused to be disconnected from the bus. As an example, the integrity signal circuit may send a disconnect command to cause this new slave device to become disconnected from the bus, at least for a given time period (before the slave device may again request to join the bus). Or in other cases, the signal integrity circuit may autonomously send a join invitation to this added device, e.g., when another device exits from the bus, or due to other changes to dynamic bus operation.

Otherwise if it is determined that the new device is allowed to join the bus, configuration operations to determine an optimal signal integrity for the bus and update one or more parameters of the host controller (e.g., as discussed above at blocks 230 and 240) may be performed (block 360). Then at block 370, the new device is enabled to coupled to the bus, e.g., by providing the device with an available address. Understand while shown at this high level in the embodiment of FIG. 3, of course many variations and alternatives are possible.

Embodiments thus provide techniques to dynamically optimize a host controller and/or bus based on actual bus topology. As such, embodiments provide a system designer flexibility for multi-drop buses to optimize a signal integrity design for dynamically changing parasitic loads. In this way, over-designing for potential hot-plugged devices is eliminated. Embodiments may be particularly applicable to low power computing systems such as smartphones or other small mobile devices, to reduce power consumption by optimizing host controller parameters (such as buffer power) when one or more slave devices are powered down (or completely removed) from the multi-drop bus.

Figure 4:
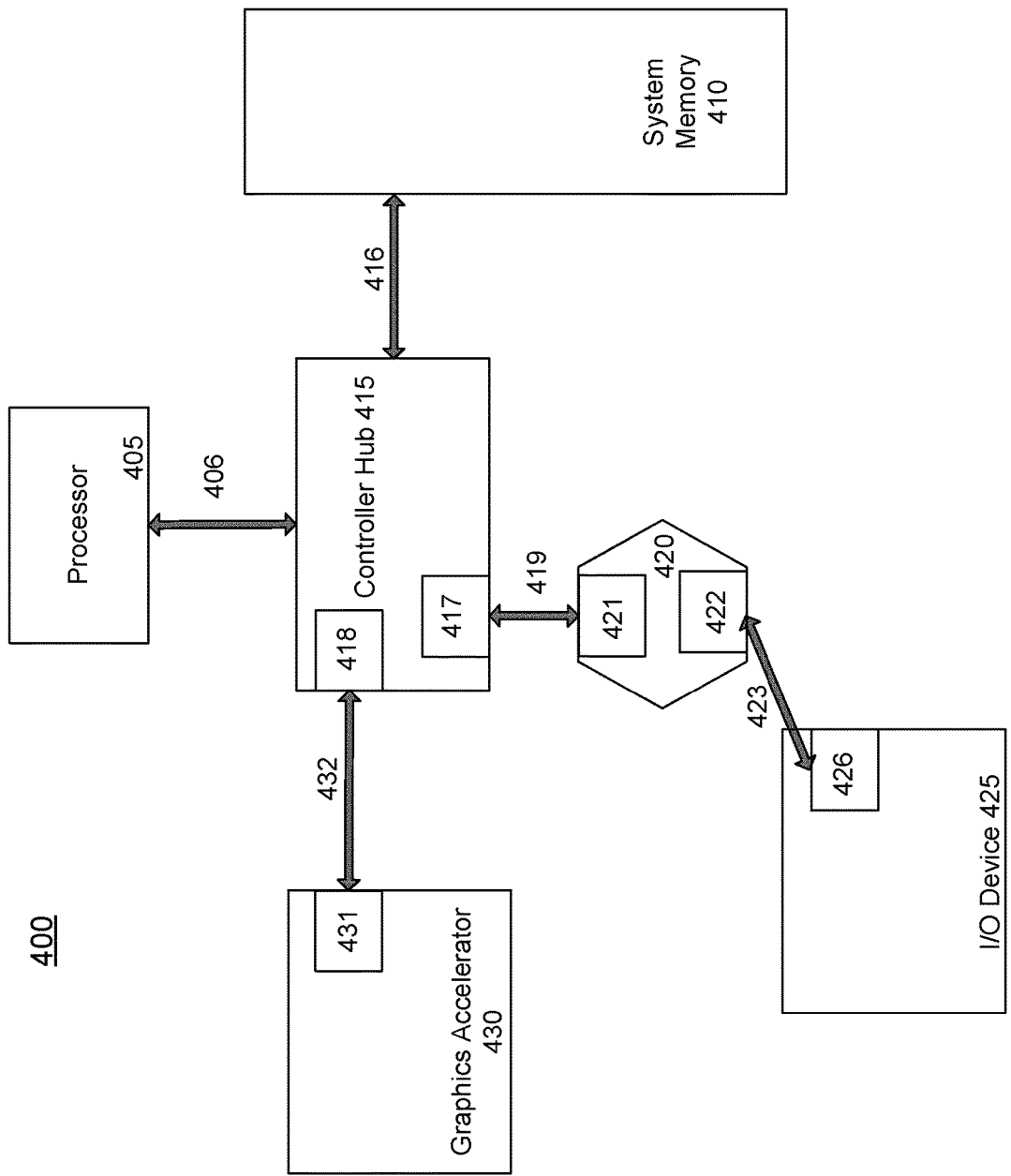
FIG. 4 is an embodiment of a fabric composed of point-to-point links that interconnect a set of components.

Embodiments may be implemented in a wide variety of interconnect structures. Referring to FIG. 4, an embodiment of a fabric composed of point-to-point links that interconnect a set of components is illustrated. System 400 includes processor 405 and system memory 410 coupled to controller hub 415. Processor 405 includes any processing element, such as a microprocessor, a host processor, an embedded processor, a co-processor, or other processor. Processor 405 is coupled to controller hub 415 through front-side bus (FSB) 406. In one embodiment, FSB 406 is a serial point-to-point interconnect. In another embodiment, link 406 includes a parallel serial, differential interconnect architecture that is compliant with different interconnect standards, and which may couple with one or more host controllers to perform dynamic signal integrity control as described herein.

System memory 410 includes any memory device, such as random access memory (RAM), non-volatile (NV) memory, or other memory accessible by devices in system 400. System memory 410 is coupled to controller hub 415 through memory interface 416. Examples of a memory interface include a double-data rate (DDR) memory interface, a dual-channel DDR memory interface, and a dynamic RAM (DRAM) memory interface.

In one embodiment, controller hub 415 is a root hub, root complex, or root controller in a PCIe interconnection hierarchy. Examples of controller hub 415 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 405, while controller 415 is to communicate with I/O devices, in a similar manner as described below. In some embodiments, peer-to-peer routing is optionally supported through root complex 415.

Here, controller hub 415 is coupled to switch/bridge 420 through serial link 419. Input/output modules 417 and 421, which may also be referred to as interfaces/ports 417 and 421, include/implement a layered protocol stack to provide communication between controller hub 415 and switch 420. In one embodiment, multiple devices are capable of being coupled to switch 420.

Switch/bridge 420 routes packets/messages from device 425 upstream, i.e., up a hierarchy towards a root complex, to controller hub 415 and downstream, i.e., down a hierarchy away from a root controller, from processor 405 or system memory 410 to device 425. Switch 420, in one embodiment, is referred to as a logical assembly of multiple virtual PCI-to-PCI bridge devices. Device 425 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 425 may include a PCIe to PCI/PCI-X bridge to support legacy or other version PCI devices. Endpoint devices in PCIe are often classified as legacy, PCIe, or root complex integrated endpoints.

Graphics accelerator 430 is also coupled to controller hub 415 through serial link 432. In one embodiment, graphics accelerator 430 is coupled to an MCH, which is coupled to an ICH. Switch 420, and accordingly I/O device 425, is then coupled to the ICH. I/O modules 431 and 418 are also to implement a layered protocol stack to communicate between graphics accelerator 430 and controller hub 415. A graphics controller or the graphics accelerator 430 itself may be integrated in processor 405.

Figure 5:
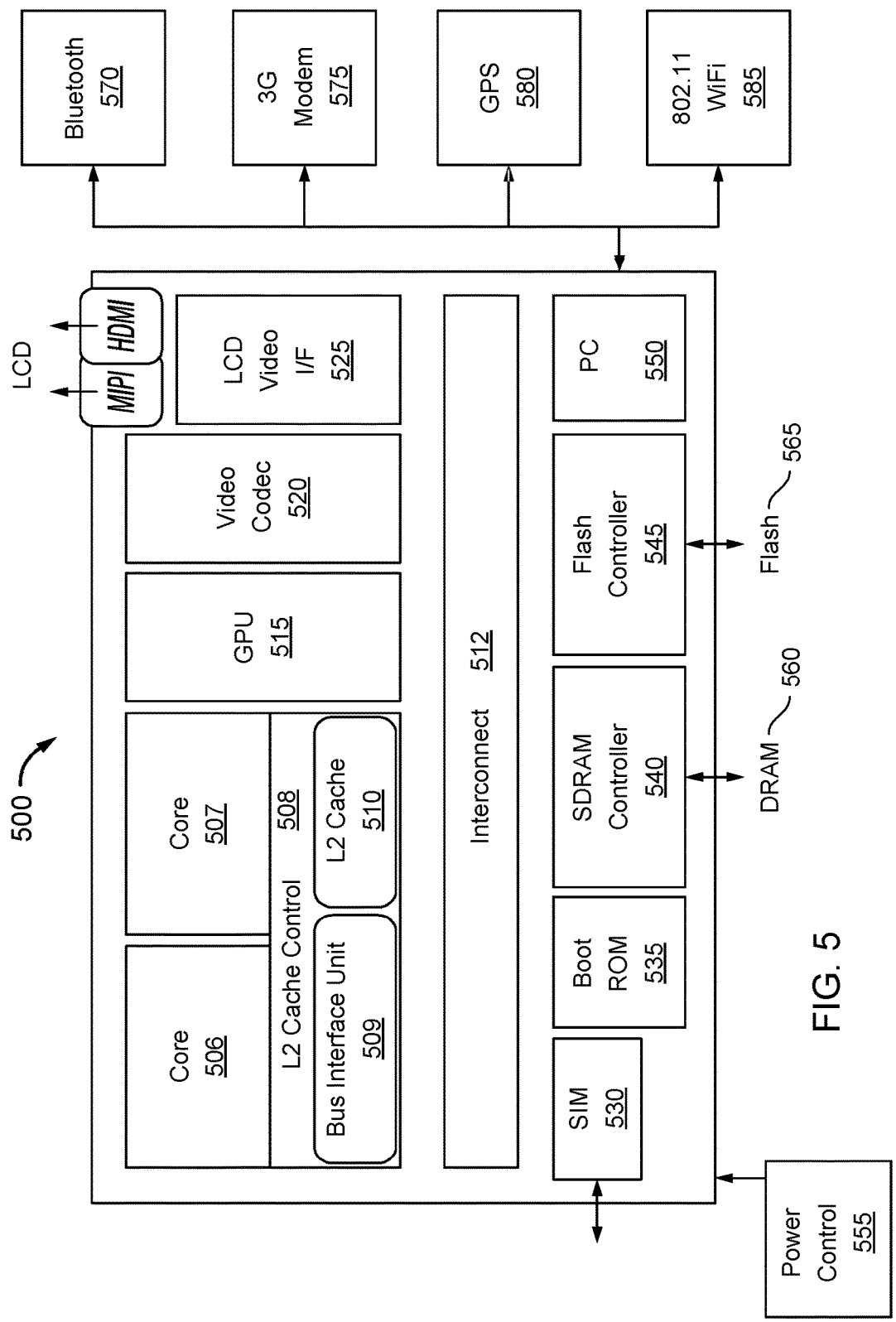
FIG. 5 is an embodiment of a system-on-chip design in accordance with an embodiment.

Turning next to FIG. 5, an embodiment of a SoC design in accordance with an embodiment is depicted. As a specific illustrative example, SoC 500 may be configured for insertion in any type of computing device, ranging from portable device to server system. Here, SoC 500 includes 2 cores—506 and 507. Cores 506 and 507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 506 and 507 are coupled to cache control 508 that is associated with bus interface unit 509 and L2 cache 510 to communicate with other parts of system 500 via an interconnect 512.

Interconnect 512 provides communication channels to the other components, such as a Subscriber Identity Module (SIM) 530 to interface with a SIM card, a boot ROM 535 to hold boot code for execution by cores 506 and 507 to initialize and boot SoC 500, a SDRAM controller 540 to interface with external memory (e.g., DRAM 560), a flash controller 545 to interface with non-volatile memory (e.g., flash 565), a peripheral controller 550 (e.g., an eSPI interface) to interface with peripherals, video codecs 520 and video interface 525 to display and receive input (e.g., touch enabled input), GPU 515 to perform graphics related computations, etc. Any of these interconnects/interfaces may incorporate aspects described herein, including dynamic control of configurations and capabilities to improve signal integrity as described herein. In addition, the system illustrates peripherals for communication, such as a Bluetooth module 570, 3G modem 575, GPS 580, and WiFi 585. Also included in the system is a power controller 555.

Figure 6:
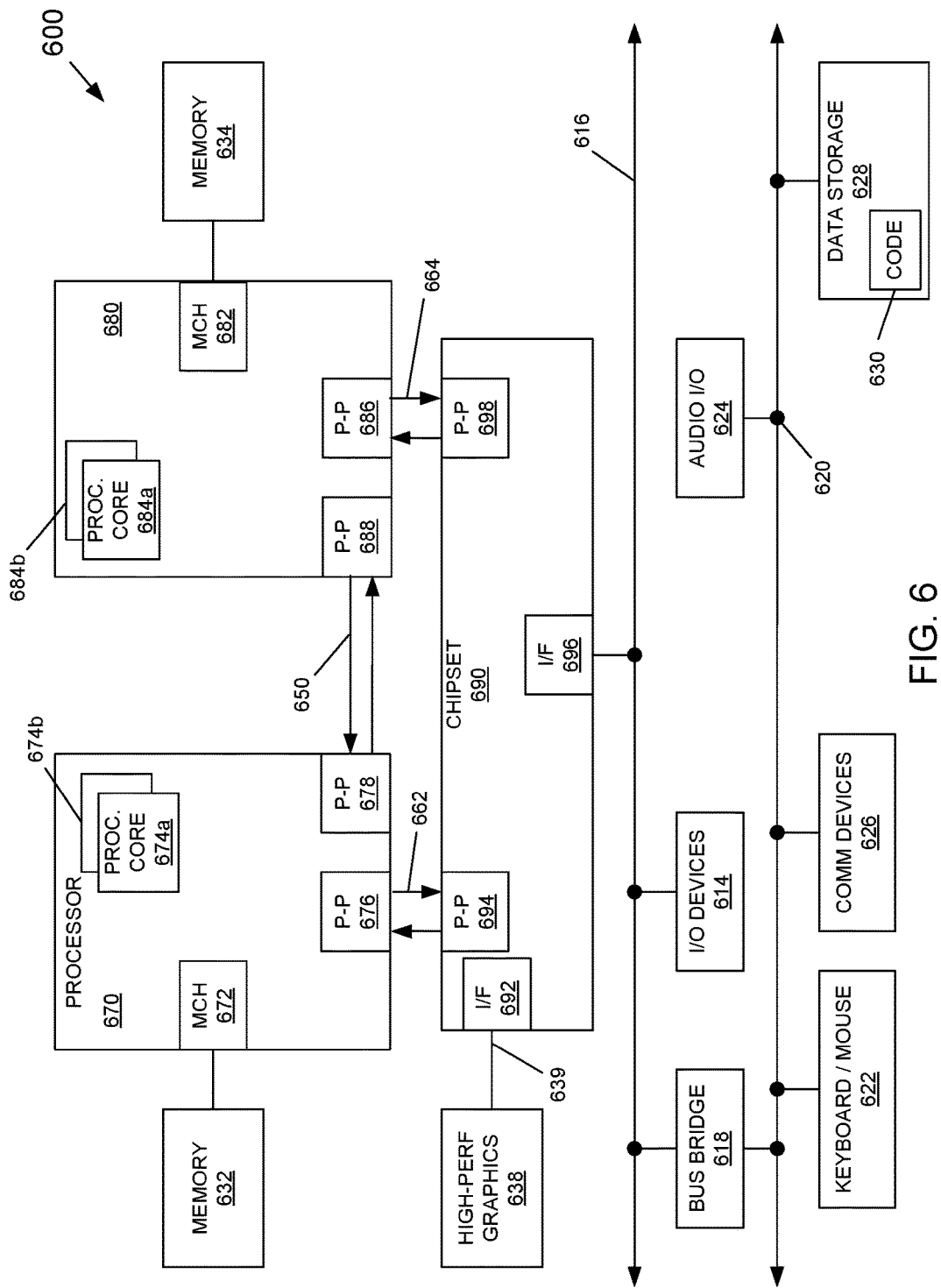
FIG. 6 is a block diagram of a system in accordance with an embodiment of the present invention.

Referring now to FIG. 6, shown is a block diagram of a system in accordance with an embodiment of the present invention. As shown in FIG. 6, multiprocessor system 600 includes a first processor 670 and a second processor 680 coupled via a point-to-point interconnect 650. As shown in FIG. 6, each of processors 670 and 680 may be many core processors including representative first and second processor cores (i.e., processor cores 674*a* and 674*b* and processor cores 684*a* and 684*b*).

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Any of the devices shown in FIG. 6 may be configured to perform dynamic signal integrity control for one or more of the interconnect structures, as described herein.

The following Examples pertain to further embodiments.

In one example, an apparatus includes a host controller to couple to an interconnect to which a plurality of devices may be coupled. In this example, the host controller includes: a first driver to drive first information onto the interconnect; a first receiver to receive second information comprising parameter information of at least one of the plurality of devices from the interconnect; and an integrity control circuit to receive the parameter information of the at least one of the plurality of devices and dynamically update at least one capability of the host controller based at least in part on the parameter information.

In an example, the integrity control circuit is to dynamically update a configuration of a first current source to couple to the first driver based at least in part on the parameter information.

In an example, the at least one capability of the host controller comprises one or more of a delay configuration, a buffer impedance, and a slew rate.

In an example, the integrity control circuit is to dynamically update the at least one capability of the host controller when at least one device of the plurality of devices is coupled to the interconnect or de-coupled from the interconnect.

In an example, the integrity control circuit is to access a table based at least in part on the parameter information and obtain control information to update the at least one capability of the host controller.

In an example, the integrity control circuit is to dynamically calculate the at least one capability of the host controller based at least in part on the parameter information.

In an example, the integrity control circuit is to receive an indication of a new device to couple to the interconnect and, in response to parameter information of the new device, to prevent the new device from being coupled to the interconnect.

In an example, a first device of the plurality of devices is to be always connected to the interconnect and powered on during operation of a system.

In an example, a second device of the plurality of devices is to be always connected to the interconnect and dynamically power controlled during operation of the system.

In an example, the parameter information comprises parasitic information of the at least one device.

In another example, a method includes: obtaining, via a host controller, device information from one or more devices coupled to an interconnect; calculating one or more configuration values for the host controller based on the device information; and dynamically updating one or more configuration parameters of the host controller based on the one or more configuration values.

In an example, the method further comprises: identifying a new device to be coupled to the interconnect; and obtaining device information of the new device.

In an example, the method further comprises: determining whether the new device is allowed to be coupled to the interconnect, based at least in part on the device information of the new device; and responsive to determining that the new device is allowed to be coupled to the interconnect, sending a message to the new device to enable the new device to be coupled to the interconnect.

In an example, the method further comprises: determining to prevent the new device from being coupled to the interconnect, based at least in part on the device information of the new device; and responsive to determining that the new device is prevented from being coupled to the interconnect, sending a message to the new device to prevent the new device from being coupled to the interconnect.

In an example, dynamically updating one or more configuration parameters of the host controller comprises sending control signals to one or more switches of the host controller, to cause a first current source coupled between a supply voltage and an output driver of the host controller to be dynamically configured.

In an example, the method further comprises sending a first message from the host controller to a first device to request the device information from the first device, the first device storing the first information in at least one register of the first device.

In an example, the method further comprises accessing a lookup table, via the host controller, based at least in part on the device information to obtain the one or more configuration parameters.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another embodiment, a system includes: a first device coupled to a host controller via a bus, where the first device includes at least one first storage to store first device information regarding one or more parasitic loading parameters of the first device; and a second device coupled to the host controller via the bus, where the second device includes a power controller to couple the second device to the bus when the second device is active and otherwise to de-couple the second device from the bus. The second device may further include least one second storage to store second device information regarding one or more parasitic loading parameters of the second device. In turn, the host controller may have a control circuit to receive the first device information and the second device information and dynamically update at least one configuration parameter of the host controller based thereon.

In an example, the host controller includes: a first driver to drive first information onto the bus, the first driver to couple to a first current source; and a first receiver to receive the first device information and the second device information, the first receiver to couple to a second current source, where the host controller is to dynamically control a configuration of at least one of the first current source and the second current source based at least in part on the first device information and the second device information.

In an example, the system further includes a third device to dynamically couple to the bus, where the host controller is to determine whether to allow the third device to be coupled to the bus, based at least in part on third device information regarding one or more parasitic loading parameters of the third device.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a host controller to couple to an interconnect to which a plurality of devices may be coupled, the host controller including:
a first driver to drive first information onto the interconnect;
a first current source coupled to the first driver;
a first receiver to receive second information comprising device parameter information of at least one of the plurality of devices from the interconnect, the device parameter information stored in a corresponding configuration storage included in the at least one device and comprising parasitic information of the at least one device; and
an integrity control circuit to receive the device parameter information of the at least one of the plurality of devices and dynamically update a configuration of the first current source based at least in part on the device parameter information.

2. The apparatus of claim 1, wherein the integrity control circuit is to dynamically update at least one capability of the host controller comprising one or more of a delay configuration, a buffer impedance, and a slew rate.

3. The apparatus of claim 1, wherein the integrity control circuit is to dynamically update at least one capability of the host controller when at least one device of the plurality of devices is coupled to the interconnect or de-coupled from the interconnect.

4. The apparatus of claim 1, wherein the integrity control circuit is to access a table based at least in part on the device parameter information and obtain control information to update at least one capability of the host controller.

5. The apparatus of claim 1, wherein the integrity control circuit is to dynamically calculate at least one capability of the host controller based at least in part on the device parameter information.

6. The apparatus of claim 1, wherein the integrity control circuit is to receive an indication of a new device to couple to the interconnect and, in response to device parameter information of the new device, to prevent the new device from being coupled to the interconnect.

7. The apparatus of claim 1, wherein a first device of the plurality of devices is to be always connected to the interconnect and powered on during operation of a system.

8. The apparatus of claim 7, wherein a second device of the plurality of devices is to be always connected to the interconnect and dynamically power controlled during operation of the system.

9. A non-transitory machine-readable medium having stored thereon instructions, which if performed by a machine cause the machine to perform a method comprising:
obtaining, via a host controller, device information from one or more devices coupled to an interconnect, the one or more devices storing the device information in at least one register of the corresponding one or more devices, the device information comprising parasitic information of the one or more devices;
calculating one or more configuration values for the host controller based on the device information; and
dynamically updating one or more configuration parameters of the host controller based on the one or more configuration values, to cause a first current source coupled between a supply voltage and an output driver of the host controller to be dynamically configured.

10. The non-transitory machine-readable medium of claim 9, wherein the method further comprises:
identifying a new device to be coupled to the interconnect; and
obtaining device information of the new device.

11. The non-transitory machine-readable medium of claim 10, wherein the method further comprises:
determining whether the new device is allowed to be coupled to the interconnect, based at least in part on the device information of the new device; and
responsive to determining that the new device is allowed to be coupled to the interconnect, sending a message to the new device to enable the new device to be coupled to the interconnect.

12. The non-transitory machine-readable medium of claim 10, wherein the method further comprises:
determining to prevent the new device from being coupled to the interconnect, based at least in part on the device information of the new device; and
responsive to determining that the new device is prevented from being coupled to the interconnect, sending a message to the new device to prevent the new device from being coupled to the interconnect.

13. The non-transitory machine-readable medium of claim 9, wherein dynamically updating the one or more configuration parameters of the host controller comprises sending control signals to one or more switches of the host controller.

14. The non-transitory machine-readable medium of claim 9, wherein the method further comprises sending a first message from the host controller to a first device to request the device information from the first device.

15. The non-transitory machine-readable medium of claim 9, wherein the method further comprises accessing a lookup table, via the host controller, based at least in part on the device information to obtain the one or more configuration parameters.

16. A system comprising:
a first device coupled to a host controller via a bus, wherein the first device includes at least one first configuration storage to store first device information regarding one or more parasitic loading parameters of the first device;
a second device coupled to the host controller via the bus, wherein the second device includes a power controller to couple the second device to the bus when the second device is active and otherwise to de-couple the second device from the bus, the second device further including least one second configuration storage to store second device information regarding one or more parasitic loading parameters of the second device; and
the host controller having at least one current source and a control circuit to receive the first device information and the second device information and dynamically update at least one configuration parameter of the host controller based thereon, to cause the at least one current source to hold the bus at a logic level against a leakage current of at least the first device and the second device.

17. The system of claim 16, wherein the host controller comprises:
   a first driver to drive first information onto the bus, the first driver to couple to a first current source; and
   a first receiver to receive the first device information and the second device information, the first receiver to couple to a second current source, wherein the host controller is to dynamically control a configuration of at least one of the first current source and the second current source based at least in part on the first device information and the second device information.

18. The system of claim 16, further comprising a third device to dynamically couple to the bus, wherein the host controller is to determine whether to allow the third device to be coupled to the bus, based at least in part on third device information regarding one or more parasitic loading parameters of the third device stored in a third configuration storage of the third device.

\* \* \* \* \*